United States Patent
Naik et al.

(10) Patent No.: US 8,473,158 B2
(45) Date of Patent: Jun. 25, 2013

(54) STABILITY-BASED STEERING CONTROL METHODS AND SYSTEMS

(75) Inventors: Anand P. Naik, Saginaw, MI (US); Michael K. Hales, Midland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 730 days.

(21) Appl. No.: 12/547,940

(22) Filed: Aug. 26, 2009

(65) Prior Publication Data

US 2011/0054737 A1    Mar. 3, 2011

(51) Int. Cl.
*B62D 6/00*    (2006.01)

(52) U.S. Cl.
USPC ............... 701/41; 701/36; 701/42; 701/43; 701/44; 318/432

(58) Field of Classification Search
None
See application file for complete search history.

(56) References Cited

U.S. PATENT DOCUMENTS

| | | | | |
|---|---|---|---|---|
| 5,504,403 A * | 4/1996 | McLaughlin | ............... | 318/432 |
| 5,668,722 A * | 9/1997 | Kaufmann et al. | ............. | 701/41 |
| 6,370,460 B1 * | 4/2002 | Kaufmann et al. | ............. | 701/41 |
| 6,422,335 B1 * | 7/2002 | Miller | ............... | 180/446 |
| 6,631,781 B2 * | 10/2003 | Williams et al. | ............. | 180/443 |
| 6,804,594 B1 * | 10/2004 | Chen et al. | ............... | 701/42 |
| 6,832,144 B2 * | 12/2004 | Momiyama et al. | ............. | 701/41 |
| 7,132,811 B2 * | 11/2006 | Katch et al. | ............... | 318/432 |
| 2002/0035424 A1 * | 3/2002 | Kaufmann et al. | ............. | 701/41 |
| 2003/0055546 A1 * | 3/2003 | Demerly et al. | ............... | 701/42 |
| 2003/0074120 A1 * | 4/2003 | Kleinau | ............... | 701/41 |
| 2004/0019406 A1 * | 1/2004 | Wang et al. | ............... | 700/231 |
| 2004/0031641 A1 * | 2/2004 | McLaughlin | ............... | 180/446 |
| 2004/0068353 A1 * | 4/2004 | Momiyama et al. | ............. | 701/41 |
| 2004/0189228 A1 * | 9/2004 | Katch et al. | ............... | 318/432 |
| 2005/0115753 A1 * | 6/2005 | Pemberton et al. | ............. | 180/167 |
| 2005/0251311 A1 * | 11/2005 | Burton et al. | ............... | 701/41 |
| 2006/0175998 A1 * | 8/2006 | Katch et al. | ............... | 318/432 |
| 2007/0240929 A1 * | 10/2007 | Kaufmann et al. | ............. | 180/441 |

FOREIGN PATENT DOCUMENTS

| | | |
|---|---|---|
| EP | 1407958 A2 | 4/2004 |
| EP | 1759956 A1 | 3/2007 |
| EP | 2100797 A1 | 9/2009 |

OTHER PUBLICATIONS

Extended European Search Report dated Mar. 1, 2011 for European Application No. 10008805.3.

\* cited by examiner

*Primary Examiner* — Khoi Tran
*Assistant Examiner* — Jonathan L Sample
(74) *Attorney, Agent, or Firm* — Cantor Colburn LLP (57) ABSTRACT

A control system for controlling a steering system to maintain stability of the steering system is provided. The control system includes an operating conditions module that estimates at least one operating gain based on an operating condition of the steering system. A blend module estimates a blend value based on the at least one operating gain. A steering assist module generates a steering assist command based on the blend value.

18 Claims, 6 Drawing Sheets

STABILITY-BASED STEERING CONTROL METHODS AND SYSTEMS

FIELD

The present disclosure relates to steering control methods and systems, and more particularly to steering control methods and systems that are based on stability of the steering system.

BACKGROUND

Electric Power Steering (EPS) systems use an electric motor, a coupling mechanism, and an electronic control module to assist a driver when steering a vehicle. One of the primary objectives of such a system is to be able to provide high levels of assist for steering a vehicle with high steering loads. During this condition the EPS system provides higher gain/assist values as higher driver torque levels are sensed. To maintain system stability during this operating condition a compensation scheme is used.

While the compensation filter enhances system stability, it can also degrade steering feel, particularly during on-center driving. In an effort to improve on-center steering feel, tuning engineers can use a vehicle velocity dependent compensator blend (VDCB) function to decrease the effect of the compensator filter at higher vehicle speeds.

However, the above approach does not differentiate between the levels of steering assist gain. This limitation often requires tuning engineers to compromise between on-center steering feel and system stability. If not tuned optimally, the approach may drive the system to be unstable at certain operating conditions.

SUMMARY

Accordingly, a control system for controlling a steering system to maintain stability of the steering system is provided. The control system includes an operating conditions module that estimates at least one operating gain based on an operating condition of the steering system. A blend module estimates a blend value based on the at least one operating gain. A steering assist module generates a steering assist command based on the blend value. These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
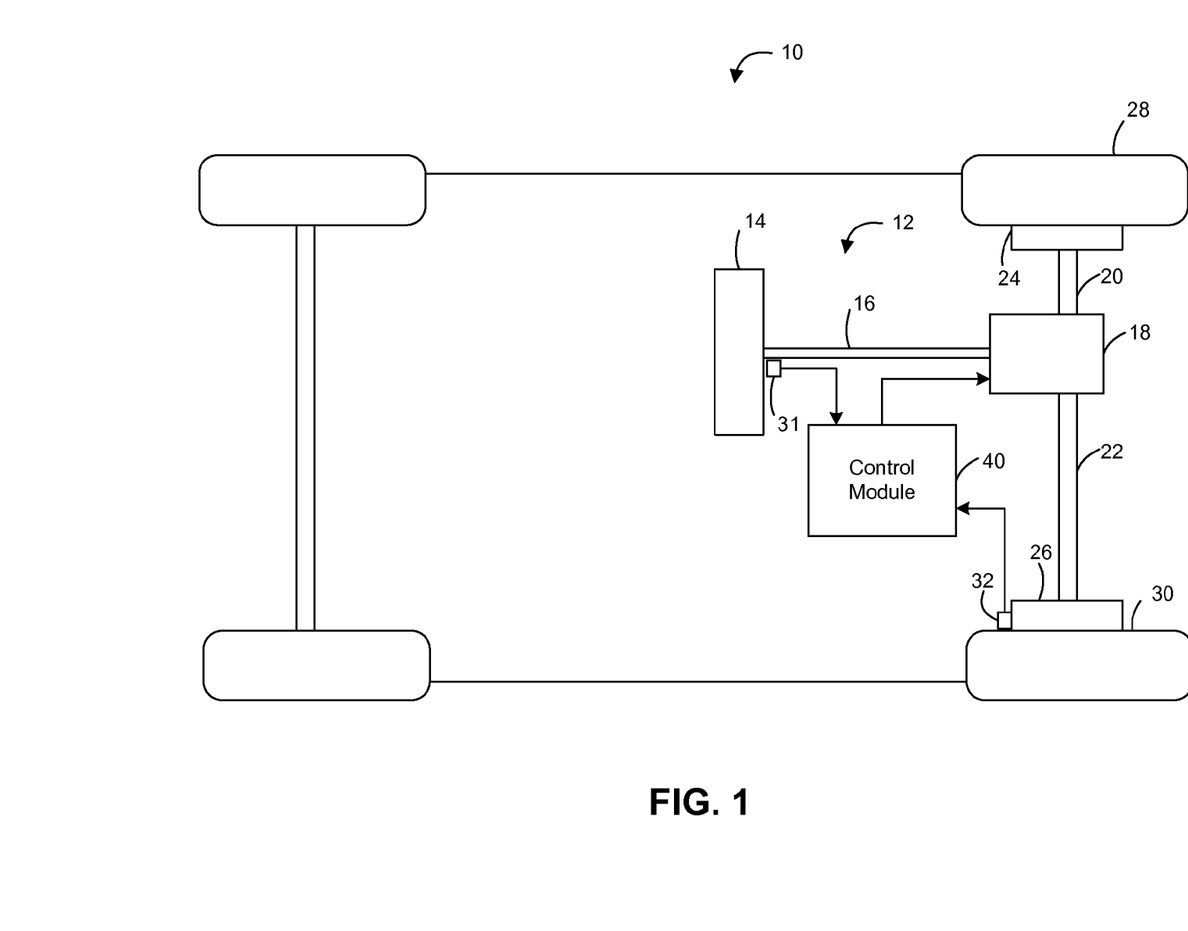
FIG. 1 is a functional block diagram illustrating a vehicle including a steering control system in accordance with exemplary embodiments.

Referring now to FIG. 1, where the invention will be described with reference to specific embodiments without limiting same, an exemplary embodiment of a vehicle 10 including a steering system 12 is illustrated. In various embodiments, the steering system 12 includes a hand wheel 14 coupled to a steering shaft 16. In one exemplary embodiment, the steering system 12 is an electric power steering (EPS) system that further includes a steering assist unit 18 that couples to the steering shaft 16 of the steering system 12 and to tie rods 20, 22 of the vehicle 10. The steering assist unit 18 includes, for example, a rack and pinion steering mechanism (not shown) that may be coupled through the steering shaft 16 to a steering actuator motor and gearing. During operation, as the hand wheel 14 is turned by a vehicle operator, the motor of the steering assist unit 18 provides the assistance to move the tie rods 20, 22 which in turn moves steering knuckles 24, 26, respectively, coupled to roadway wheels 28, 30, respectively of the vehicle 10.

As shown in FIG. 1, the vehicle 10 further includes various sensors 31, 32 that detect and measure observable conditions of the steering system 12 and/or of the vehicle 10. The sensors 31, 32 generate sensor signals based on the observable conditions. In one example, the sensor 31 is a torque sensor that senses the torque applied to the hand wheel 14 by the operator of the vehicle 10. The torque sensor generates a driver torque signal based thereon. In another example, the sensor 32 is a vehicle speed sensor that senses a rotational speed of the wheel 30. The sensor 32 generates a vehicle speed signal based thereon. A vehicle velocity can then be determined based on the vehicle speed signal.

A control module 40 controls the operation of the steering system 12 based on one or more of the sensor signals and further based on the steering control systems and methods of the present disclosure. Generally speaking, the steering control systems and methods of the present disclosure generate a final assist command to the motor of the steering assist unit 18 to control the amount of assist provided to the steering system 12. The steering control systems and methods generate the final assist command based on an overall stability of the steering system 12 and/or a velocity of the vehicle 10.

Figure 2:
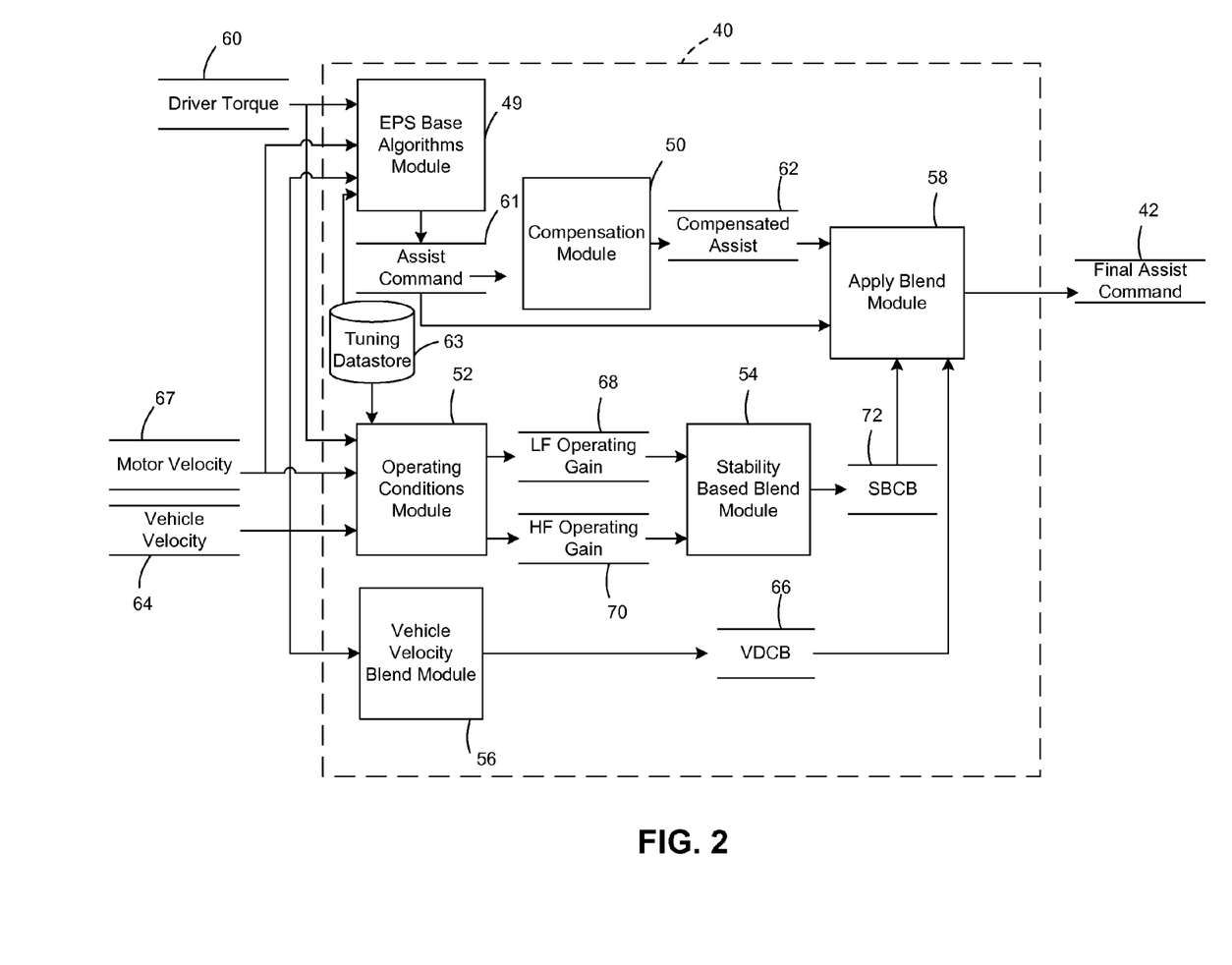
FIG. 2 is a dataflow diagram illustrating a steering control system in accordance with exemplary embodiments.

Referring now to FIG. 2, a dataflow diagram illustrates an exemplary embodiment of the control module 40 of FIG. 1 used to control the steering system 12 of FIG. 1. In various embodiments, the control module 40 can include one or more sub-modules and datastores. As used herein the terms module and sub-module refer to processing circuitry such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules shown in FIG. 2 can be combined and/or further partitioned to similarly generate a final assist command 42 based on a stability of the steering system 12 (FIG.

1). Inputs to the control module 40 can be generated from the sensors 31, 32 (FIG. 1) of the vehicle 10 (FIG. 1), can be received from other control modules (not shown) within the vehicle 10 (FIG. 1), can be modeled, and/or can be predefined.

In the example of FIG. 2, the control module 40 includes an electronic power steering (EPS) base algorithms module 49, a compensation module 50, an operating conditions module 52, a stability based blend module 54, a vehicle velocity blend module 56, and an apply blend module 58. The EPS base algorithms module 49 receives as input driver torque 60, motor velocity 67, and/or vehicle velocity 64. The EPS base algorithms module generates an assist command 61 based on the inputs, one or more EPS base algorithms, and one or more EPS tuning values stored in a tuning datastore 63. The compensation module 50 receives as input the assist command 61. The compensation module 50 estimates a compensated assist value 62 by applying a compensation filter to the assist command 61. In one example, the compensation filter is a unity gain, second-order compensator filter.

The vehicle velocity blend module 56 receives as input vehicle velocity 64. The vehicle velocity blend module 56 determines a vehicle velocity compensator blend value (VDCB) 66 based on the vehicle velocity 64. In various embodiments, the vehicle velocity blend module 56 determines the VDCB 66 based on a velocity blend lookup table that is defined as a function of the vehicle velocity 64. An interpolation function can then be used to determine the VDCB 66 relative to the current vehicle velocity 64 from the velocity blend lookup table.

The operating conditions module 52 receives as input one or more input values indicating operating conditions of the steering system 12 (FIG. 1) and/or of the vehicle 10 (FIG. 1). In one example, the operating conditions module receives as input the driver torque 60, the vehicle velocity 64, and/or the motor velocity 67 or hand wheel velocity. Based on the inputs, the operating conditions module 52 estimates one or more operating gains. The operating gains are indicative of the vehicle or steering system operating conditions. In one example, the operating conditions module 52 estimates a low frequency (LF) operating gain 68 and a high frequency (HF) operating gain 70. As can be appreciated, the operating conditions module 52 can estimate any number of operating gains based on the operating conditions of the vehicle 10 (FIG. 1) and/or steering system 12 (FIG. 1). The operating gains can be computed during runtime or can be determined from predefined gain lookup tables stored in the tuning datastore 63.

The stability based blend module 54 receives as input the operating gains 68, 70. The stability based blend module 54 estimates a stability based compensator blend value (SBCB) 72 based on the operating gains 68, 70. As will be discussed in more detail with regard to FIG. 3, the stability based blend module 54 estimates the SBCB 72 by utilizing $n^{th}$ order polynomials to represent a relationship between a compensator blend and a gain margin and the compensator blend and a phase margin. The gain margin and the phase margin represent the relative stability of the system.

The apply blend module 58 receives as input the compensated assist 62, the assist command 61, the VDCB 66, and the SBCB 72. Based on the inputs, the apply blend module 58 generates the final assist command 42 to the steering system 12 (FIG. 1). In various embodiments, the apply blend module 58 applies to the compensated assist 62 at least one of the SBCB 72 and the VDCB 66. For example, the apply blend module 58 arbitrates the final assignment of the compensator blend value between the SBCB 72 and the VCBC 66 blend such that the a balance is reached for system stability and steering feel during high velocity high torque conditions and during low velocity and low torque conditions.

In one example, the apply blend module 58 assigns a maximum of the SBCB 72 and the VCBC to a final blend value. The final blend value is then used to modulate the compensated assist 62. For example, the final assist command 42 can be determined based on the following equation:

$$FinalAssist = (CompAssist*FinalBlend) + (AssistCommand)*(100\% - FinalBlend).$$

Figure 3:
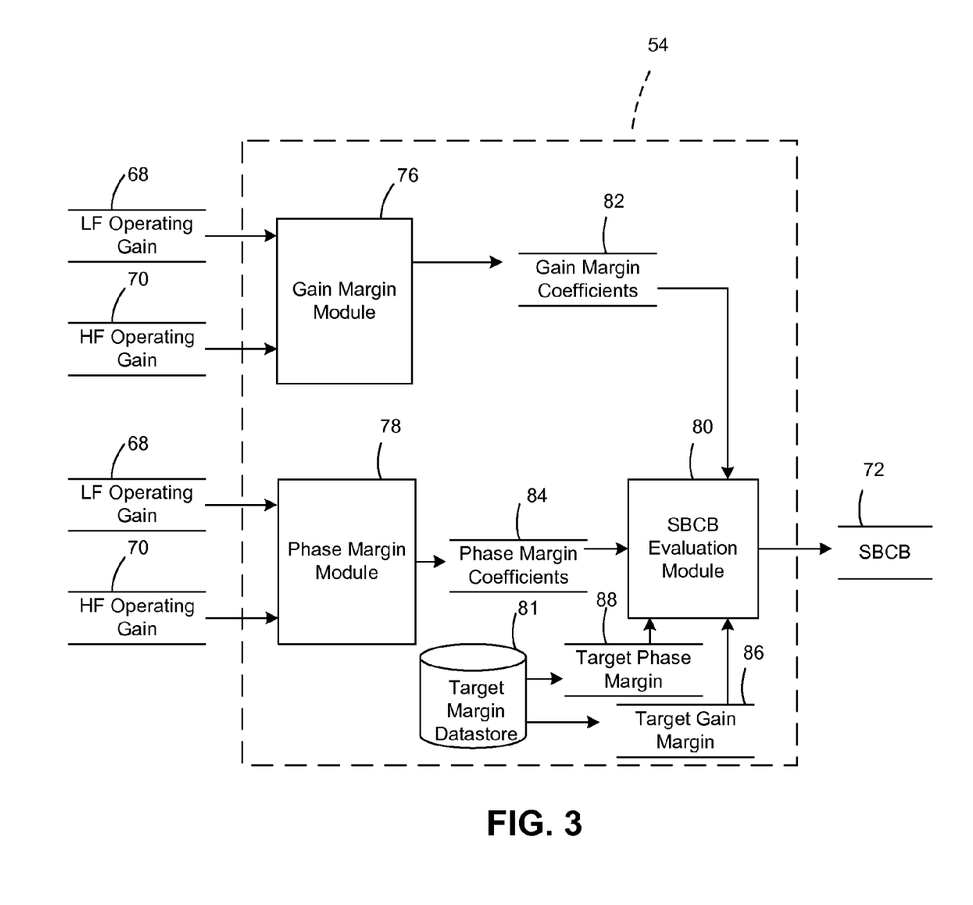
FIG. 3 is a dataflow diagram illustrating a stability based compensator blend system of the steering control system of FIG. 2 in accordance with exemplary embodiments.

Referring now to FIG. 3, a dataflow diagram illustrates an exemplary embodiment of the stability based blend module 54 of FIG. 2 that generates the SBCB 72. In various embodiments, the stability based blend module 54 can include one or more sub-modules and datastores. As can be appreciated, the sub-modules shown in FIG. 3 can be combined and/or further partitioned to similarly generate the SBCB 72. Inputs to the stability based blend module 54 can be generated from the sensors 31, 32 (FIG. 1) of the vehicle 10 (FIG. 1), can be received from other control modules (not shown) within the vehicle 10 (FIG. 1), can be modeled, and/or can be predefined.

In the example of FIG. 3, the stability based blend module 54 includes a gain margin module 78, a phase margin module 78, a stability based compensation blend (SBCB) evaluation module 80, and a target margin datastore 81. The gain margin module 76 receives as input the operating gains 68, 70 generated by the operating conditions module 52 (FIG. 2). Based on the operating gains 68, 70, the gain margin module 76 estimates one or more gain margin coefficients 82. In various embodiments, the gain margin coefficients 82 are obtained from one or more gain margin coefficient lookup tables defined by the various operating gains 68, 70. For example, an interpolation function can be used to determine the respective coefficient relevant to the operating condition indicated by the operating gains 68, 70. As will be discussed in more detail with regard to FIG. 6, in various embodiments, the values in the gain margin coefficient lookup tables can be populated based on coefficients obtained from an inverse function of the system stability. In various other embodiments, the gain margin coefficients 82 are computed and used real-time based on the inverse function.

The phase margin module 78 receives as input the operating gains 68, 70 generated by the operating conditions module 52 (FIG. 2). Based on the operating gains 68, 70, the phase margin module 78 estimates one or more phase margin coefficients 84. In various embodiments, the phase margin coefficients 84 are obtained from one or more phase margin coefficient lookup tables defined by the various operating gains 68, 70. For example, an interpolation function can be used to determine the respective coefficient relevant to the operating condition indicated by the operating gains 68, 70. As will be discussed in more detail with regard to FIG. 6, in various embodiments, the values in the phase margin coefficient lookup tables can be populated based on coefficients obtained from an inverse function of the system stability. In various other embodiments, the phase margin coefficients 82 are computed and used real-time based on the inverse function.

The SBCB evaluation module 80 receives as input the gain margin coefficients 82, the phase margin coefficients 84, a target gain margin 86, and a target phase margin 88. In various embodiments, the target gain margin 86 and the target phase martin 88 are predefined values stored in the target margin datastore 81. The target phase margin 88 and the target gain margin 86 can be predefined as a relative measure for desired system stability.

The SBCB evaluation module 80 evaluates the respective $n^{th}$ order polynomial equation with the n+1 gain margin coefficients at the target gain margin 86. Similarly, the SBCB evaluation module 80 evaluates the $n^{th}$ order polynomial equation with the n+1 phase margin coefficients 84 at the target phase margin 88. The SBCB evaluation module 80 then assigns a maximum of the result of the gain margin evaluation and the phase margin evaluation as the SBCB 72.

Figure 4:
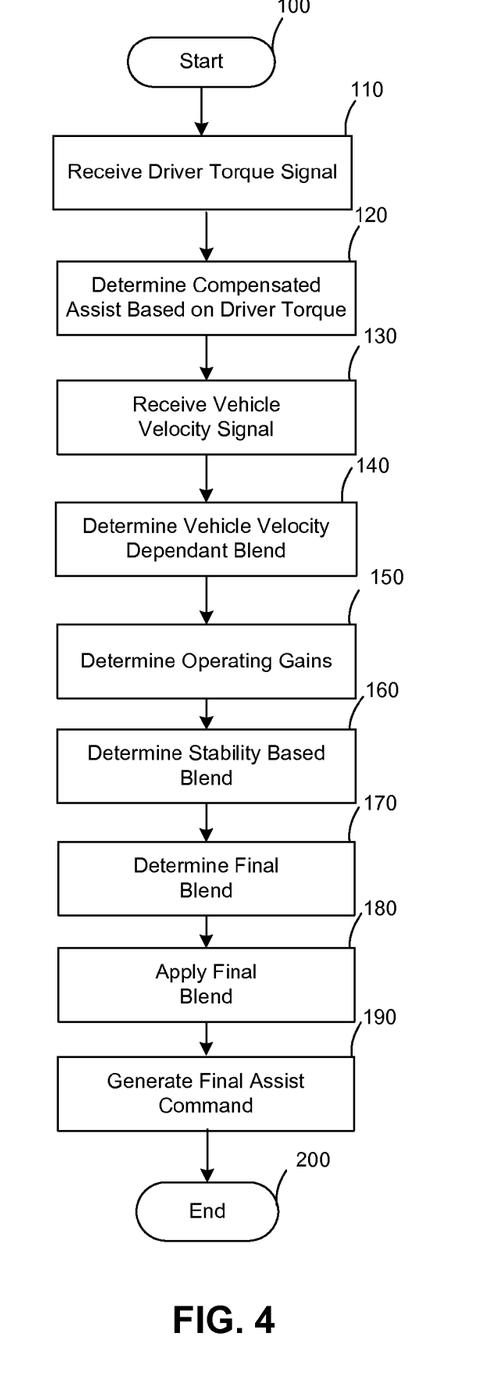
FIG. 4 is a flowchart illustrating a steering control method in accordance with exemplary embodiments.

Referring now to FIG. 4 and with continued reference to FIG. 2, a flowchart illustrates a steering control method that can be performed by the control module 40 of FIG. 2 As can be appreciated in light of the disclosure, the order of operation within the method is not limited to the sequential execution as illustrated in FIG. 4, but may be performed in one or more varying orders as applicable and in accordance with the present disclosure.

As can be appreciated, the steering control method can be scheduled to run based on predetermined events and/or can run at scheduled intervals during operation of the steering system 12 (FIG. 1).

In one example, the method may begin at 100. The driver torque 60 is received at 110. Based on the driver torque 60, the assist command 61 is determined as discussed above and the compensated assist 62 is determined based thereon as discussed above at 120. The vehicle velocity 64 is received at 130. Based on the vehicle velocity 64, the VDCB 66 is determined as discussed above at 140.

The operating gains 68, 70 are determined at 150 based on, for example, the driver torque 60 and the vehicle velocity 64 as discussed above. Based on the operating gains 68, 70, the SBCB 72 is determined as discussed above at 160. The final blend value is assigned to the maximum of the VDCB 66 and the SBCB 72 at 170. The final blend value is then applied to the compensated assist 62 as discussed above at 180. The final assist command is generated based thereon at 190. Thereafter, the method may end at 200.

Figure 5:
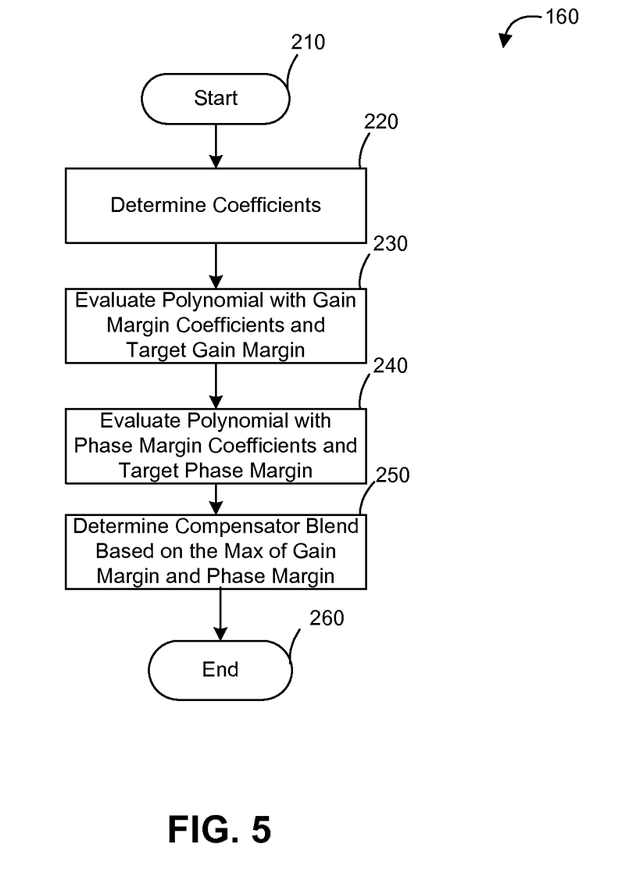
FIG. 5 is a flowchart illustrating a stability based compensator blend method in accordance with exemplary embodiments.

Referring now to FIG. 5 and with continued reference to FIGS. 2 and 3, a flowchart illustrates a compensator blend method that can be performed by the control module 40 of FIG. 2 As can be appreciated in light of the disclosure, the order of operation within the method is not limited to the sequential execution as illustrated in FIG. 5, but may be performed in one or more varying orders as applicable and in accordance with the present disclosure.

In one example, the method may begin at 210. The gain margin coefficients 82 are determined based on the operating gains 68, 70 as discussed above at 220. The phase margin coefficients 84 are determined based on the operating gains 68, 70 as discussed above at 230. The respective $n^{th}$ order polynomial is evaluated with the gain margin coefficients 82 and the target gain margin at 240. The respective $n^{th}$ order polynomial is evaluated with the phase margin coefficients 84 and the target phase margin at 250. At 260, the maximum of the result of the evaluations at 240 and 250 is determined and assigned to the SBCB 72. Thereafter, the method may end at 270.

Figure 6:
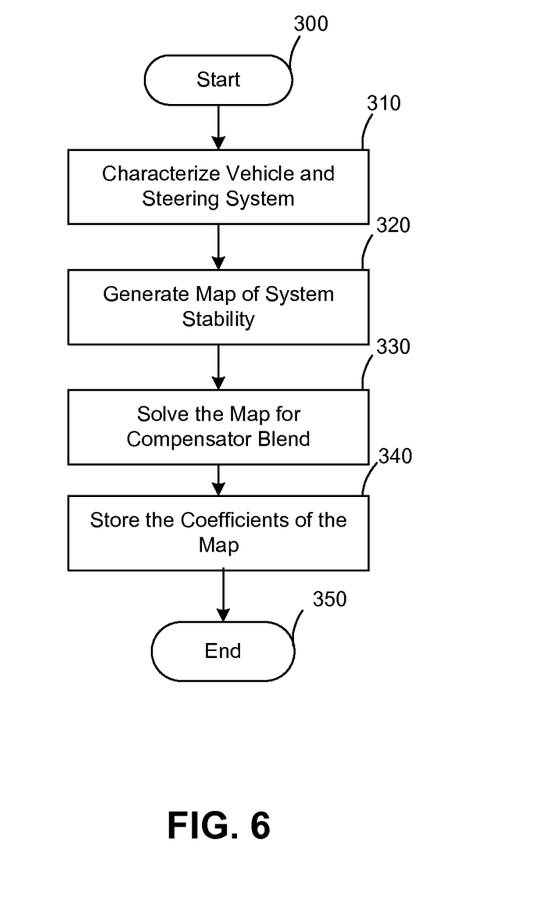
FIG. 6 is a flowchart illustrating a coefficient determination method in accordance with exemplary embodiments.

Referring now to FIG. 6, a flowchart illustrates a coefficient determination method. As can be appreciated, the coefficient determination method can be entirely offline to populate the coefficient lookup tables, and/or can be performed partially offline and partially in real-time by the control module 40 of FIG. 2. As can also be appreciated in light of the disclosure, the order of operation within the method is not limited to the sequential execution as illustrated in FIG. 6, but may be performed in one or more varying orders as applicable and in accordance with the present disclosure.

In one example, the method may begin at 300. The operating conditions of the vehicle 10 (FIG. 1) and/or the steering system 12 (FIG. 1) are characterized at 310. A map of system stability is generated as a function of the operating conditions for various compensator blend values (i.e., ranging from 0% to 100%). The map is then inverted at 320 to solve for the compensator blend at 330. The coefficients from the map are then stored as the respective phase margin coefficients and the gain margin coefficients at 340. Thereafter, the method may end at 350.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. A control system comprising processing circuitry for controlling a steering system to maintain stability of the steering system, comprising:
   an operating conditions module that estimates at least one operating gain based on an operating condition of the steering system;
   a stability based blend module that estimates a stability based compensator blend value that is based on a maximum of a phase margin and a gain margin, the phase margin representing an evaluation at a target phase margin for system stability of a first polynomial with phase margin coefficients based on the at least one operating gain, and the gain margin representing an evaluation at a target gain margin for system stability of a second polynomial with gain margin coefficients based on the at least one operating gain; and
   an apply blend module that generates a steering assist command to control the steering system based on the stability based compensator blend value.

2. The control system of claim 1 wherein the at least one operating condition is based on driver initiated torque on the steering system.

3. The control system of claim 1 wherein the operating conditions module estimates the at least one operating gain further based on at least one operating condition of a vehicle that includes the steering system.

4. The control system of claim 3 wherein the at least one operating condition is based on a vehicle velocity.

5. The control system of claim 1 wherein the operating conditions module estimates a high frequency operating gain and a low frequency operating gain based on the at least one operating condition.

6. The control system of claim 1 wherein the stability based blend module estimates the stability based compensator blend value based on an inverse function of at least one of the gain margin and the phase margin.

7. The control system of claim 1 wherein the at least one operating condition is based on motor velocity of the steering system.

8. The control system of claim 1 wherein the at least one operating condition is based on hand wheel velocity on the steering system.

9. A method of controlling a steering system by processing circuitry to maintain stability of the steering system, comprising:

estimating at least one operating gain based on at least one operating condition of the steering system;

estimating a stability based compensator blend value based on a maximum of a phase margin and gain margin, the phase margin representing an evaluation at a target phase margin for system stability of a first polynomial with phase margin coefficients based on the at least one operating gain, and the gain margin representing an evaluation at a target gain margin for system stability of a second polynomial with gain margin coefficients based on the at least one operating gain; and generating a steering assist command to control the steering system based on the stability based compensator blend value.

10. The method of claim 9 wherein the operating condition is based on driver initiated torque on the steering system.

11. The method of claim 9 wherein estimating the at least one operating gain is further based on at least one operating condition of a vehicle that includes the steering system.

12. The method of claim 11 wherein the at least one operating condition is based on a vehicle velocity.

13. The method of claim 9 wherein the estimating at least one operating gain further comprises estimating a high frequency operating gain and a low frequency operating gain based on the at least one operating condition.

14. The method of claim 9 wherein the estimating the stability based compensator blend value is based on an inverse function of at least one of the gain margin and the phase margin.

15. The method of claim 9 wherein the at least one operating condition is based on motor velocity of the steering system.

16. The method of claim 9 wherein the at least one operating condition is based on hand wheel velocity on the steering system.

17. The control system of claim 1 wherein the control system further comprises:

a vehicle velocity blend module that determines a vehicle velocity compensator blend value based on a vehicle velocity;

a compensation module that estimates a compensated assist value by applying a compensation filter to an assist command; and the apply blend module applies the compensated assist value to a maximum of the stability based compensator blend value and the vehicle velocity compensator blend value.

18. The method of claim 9, further comprising:

determining a vehicle velocity compensator blend value based on a vehicle velocity;

estimating a compensated assist value by applying a compensation filter to an assist command; and applying the compensated assist value to a maximum of the stability based compensator blend value and the vehicle velocity compensator blend value.

* * * * *